Oct. 24, 1967    R. A. O'CONNELL ETAL    3,348,332
ULTRA-VIOLET LIGHT INSECT TRAP
Filed Dec. 23, 1965
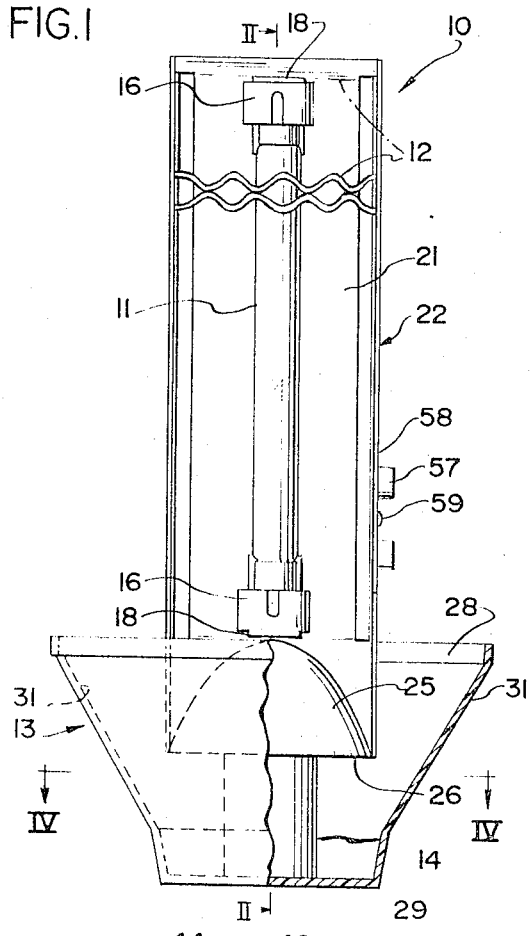
INVENTORS
ROBERT A. O'CONNELL
GRANT M. HEGRANES
BY *Alberts, Brezina & Lund*
ATTORNEYS

United States Patent Office

3,348,332
Patented Oct. 24, 1967

3,348,332
ULTRA-VIOLET LIGHT INSECT TRAP
Robert A. O'Connell and Grant M. Hegranes, Albuquerque, N. Mex., assignors to I.M.S. Corporation, Albuquerque, N. Mex., a corporation of New Mexico
Filed Dec. 23, 1965, Ser. No. 515,940
8 Claims. (Cl. 43—113)

This invention relates to a black light insect trap and more particularly to an insect trap designed for use also as a night light, and serving as an effective, inexpensive and highly efficient device for attracting and killing insects.

Black light insect traps have heretofore been proposed using fluorescent lamps operative to radiate light in the near ultra-violet spectrum and provided with suction means for drawing air and insects from the region surrounding the lamp and propelling the insects into a suitable trap. Such traps have been cumbersome and bulky, have been expensive to manufacture and to operate, and the disposal of insects has presented messy problems. In addition, the provision of suction fans and other mechanical moving parts has resulted in noise, making the traps unsuitable for use in or near sleeping quarters. This invention was evolved with the general object of overcoming the disadvantages of prior traps and of providing a completely safe, odorless, silent and effective insect trap.

Another object of this invention is to provide an insect trap from which the trapped insects can be readily removed, and which is readily cleaned.

According to this invention, an ultra-violet light source is used in a manner to not only attract insects but also to irradiate insects attracted thereto and to at least partially disable the insects by interference with their metabolic processes.

According to an important feature of the invention, the light produces sufficient radiation in the visible spectrum to serve as a night light, usable in or near sleeping quarters.

According to another important feature of the invention, a black light insect trap is provided having no moving parts so as to be silent in operation. This feature is, of course, highly advantageous when the lamp is used also as a night light in or near sleeping quarters.

A specific feature of the invention is in the provision of a protective grill work partially surrounding the light and serving as a landing place for insects in close proximity to the light source, so as to increase their exposure to the attractive but harmful ultra-violet rays.

A further feature of the invention is in the provision of a reservoir for liquid in proximity to the light source, preferably below the light source, for receiving the insects after they are partially or entirely disabled by irradiation from the ultra-violet source.

According to a specific feature of the invention, the reservoir is defined by a container which is readily removed for cleaning purposes and for disposal of trapped insects.

A further specific feature is in the design of the container in a manner such that insects can readily fall into the liquid but cannot readily fly away from the liquid.

Still another feature of the invention is in a construction such as to provide a simple and compact but highly efficient unit.

This invention contemplates other and more specific objects, features and advantages which will become more fully apparent from the following detailed description taken in conjunction with the accompanying drawings which illustrate a preferred embodiment and in which:

FIGURE 1 is a front elevational view of a black light insect trap constructed in accordance with the principles of this invention;

FIGURE 2 is a cross sectional view taken substantially along line II—II of FIGURE 1;

FIGURE 3 is a rear elevational view of a lower portion of the insect trap of FIGURE 1; and FIGURE 4 is a sectional view taken substantially along line IV—IV of FIGURE 1.

Reference numeral 10 generally designates a combination night lamp and insect trap constructed according to the principles of this invention. In essence, the lamp-trap 10 comprises an ultra-violet fluorescent lamp 11 which attracts insects around and into the grill work 12, where they are further exposed to radiation from the lamp 11 until they fall or fly into a container 13 having a liquid 14 in a reservoir portion 15. The grill work 12 extends from the upper end of the container 13 to the upper end of the unit as indicated in broken lines. Once the insects impinge on the surface of the liquid, they are prevented from flying therefrom. Preferably, the trap contains a liquid which is fatal to any flying insect striking the surface thereof. By way of example, the reservoir portion 15 may contain approximately four tablespoons of water with a few drops of a household detergent added. Other combinations with water, such as vegetable oil or lubricating oils will also work well, but are more difficult to clean out of the reservoir portion 15.

The lamp 11 is a commercially available fluorescent light with a quartz glass filter, operative to emit a low level of visible light and a high level of ultra-violet radiation with a peak output at a wave length on the order of 3654 angstroms. Such ultra-violet radiation is both attractive to flying insects and is harmful to their body metabolism, producing interference with their nervous system and dizziness which varies directly with the duration and intensity of the exposure. As a result, they are caused to fly or drop into the container 13 and into the liquid 14 in the reservoir portion 15.

Although the ultra-violet radiation from the lamp 11 is harmful to insects, it is harmless and almost invisible to humans, providing however just enough visible light to operate as a highly effective night lamp.

The lamp 11 is held in sockets 16 which, as shown in FIGURE 2, are rigidly attached to the braces 18, which are fastened by the bolts 19 to a front face 21 of a plastic body portion 22 of the lamp-trap 10. The metal grill work 12 partially surrounds the lamp 11 and extends from two vertical channels located in the body portion 22 on either side of the front face 21. In addition to being decorative, and serving as a protective device, the grill work 12 is very important in that it serves as a landing place for insects and allows maximum exposure of the insects to the harmful ultra-violet rays.

The body portion 22 has on its lower end a generally conical deflector portion 25 below the lamp 11 and grill work 12 and extending downwardly and outwardly from front face 21, while a flat horizontal wall portion 26 extends rearwardly from the lower peripheral edge of the conical portion 25. The conical portion 25 serves to direct falling or flying insects into the reservoir 15, and the wall portion 26 serves to prevent insects from flying upwardly into the interior of the body portion 22. In addition, the wall portion 26 serves as a light shield to prevent the insects from being attracted back out of the region above the liquid 14 in the reservoir 15.

According to a specific feature of the invention, the container 13 is removably connected to the body portion 22 in a manner such as to allow ready removal of insects and cleaning, as explained in detail hereinafter. With container 13 is position, a bottom wall portion 29 thereof is engageable against a supporting surface, such as on a table or desk.

Container 13 is additionally provided with a wall portion 31 of conical shape extending outwardly and upwardly from the reservoir portion and serving to direct insects into the liquid 14, an intermediate portion of the wall portion 31 being spaced a short distance from the lower peripheral edge of the conical portion 25.

To removably connect the container 13 to the body portion 22, the container 13 is formed with a portion 32 extending upwardly from the bottom wall portion 29 and of generally U-shaped cross section, arranged to embrace a portion 33 of similar U-shaped cross section which depends from the wall portion 26. An inwardly extending lip 34 at the upper end of the portion 32 is arranged to engage in a groove 35 formed at the upper end of the portion 33, below the bottom wall portion 26. The container 13 is formed with a pair of vertical back wall portions 28 interconnecting the rearward edges of portions 29, 31 and 32 and shaped to receive the lower rearward part of the portion 22.

A rubber grommet 37 is provided having an intermediate groove 38 which fits into a generally semi-circular opening 39 in the back part of the bottom portion 26, and serving to hold a power cord 41 for connection to a conventional source of AC current. It is noted that the portion 33 provides space to allow the line cord 41 to hang straight down when the lamp trap 10 is hung on a wall, or to extend horizontally from the back when the lamp-trap 10 is placed on a table or desk.

The grommet 37 is held in the opening 39 by a metal back panel 42 which is securely fastened to body portion 22 by means of molded plastic body studs 43 and countersunk screws 44. A circular opening 46 in back panel 42 is provided for hanging the trap 10 on a wall or the like.

The electrical wiring of lamp 11 from power cord 41 is a standard fluorescent wiring circuit including insulated wires 51–56, a standard fluorescent starter switch 57 which is fastened to a switch panel 58 of body portion 22 by means of a bolt 59, and a ballast 61 securely fastened to back panel 42 by means of bolts 62 and nuts 63.

The lamp-trap 10 of this invention thus provides a unit which is attractive in appearance and which serves as a night lamp and as a highly effective, efficient insect trap which is noiseless in operation and readily cleaned.

It will be understood that modifications and variations may be effected without departing from the spirit and scope of the novel concepts of this invention.

We claim as our invention:

1. In an insect trap, a vertical support, an ultra-violet insect-attracting lamp on said support, a container beneath said lamp having an insect-receiving liquid reservoir in a lower portion thereof, said container having upwardly extending wall means, deflector means underneath said lamp, said deflector means having upwardly and inwardly extending wall means, said deflector wall means having a lower portion spaced from said container wall means to define a narrow insect-receiving throat above said reservoir, and grill means adjacent said support and in generally encircling relation to said lamp, whereby insects landing on said grill means are exposed to radiation from said lamp to fall downwardly through said throat into said reservoir.

2. In an insect trap as defined in claim 1, said container wall means being flared outwardly and upwardly from said throat.

3. In an insect trap as defined in claim 1, said lamp being effective to emit sufficient visible radiation to serve as a night lamp.

4. In an insect lamp trap as defined in claim 1, said container being removably secured to said vertical support for cleaning and insect removal.

5. In an insect trap as defined in claim 4, said container having a generally flat bottom wall for supporting said trap on a horizontal support surface.

6. In an insect trap as defined in claim 1, said lamp being an elongated fluorescent tube disposed in a vertical position on said vertical support, said vertical support comprising a depending portion on the lower end thereof below said lamp, and said container having wall means adapted to embrace said depending portion.

7. In an insect trap as defined in claim 6, said depending portion being generally hollow and being open at the back and bottom thereof, an electrical power cord from said lamp, and grommet means supporting said cord at the upper end of said depending portion.

8. In an insect trap as defined in claim 1, said deflector means including a lower horizontal wall for preventing upward flight of insects.

References Cited

UNITED STATES PATENTS

| | | | |
|---|---|---|---|
| D. 190,124 | 4/1961 | Houghton | 43—113 X |
| 1,208,467 | 12/1916 | Bowerman | 43—113 |
| 1,445,906 | 2/1923 | Noonan | 43—113 |
| 1,552,649 | 9/1925 | Ross | 43—113 |
| 2,645,877 | 7/1953 | Pohlman | 43—113 |
| 2,731,762 | 1/1956 | Jones | 43—113 |
| 2,780,026 | 2/1957 | Dail | 43—139 |

ALDRICH F. MEDBERY, *Primary Examiner.*